July 30, 1940.  I. F. SCHRECK  2,209,356
TRUCK
Filed March 11, 1938  3 Sheets-Sheet 1
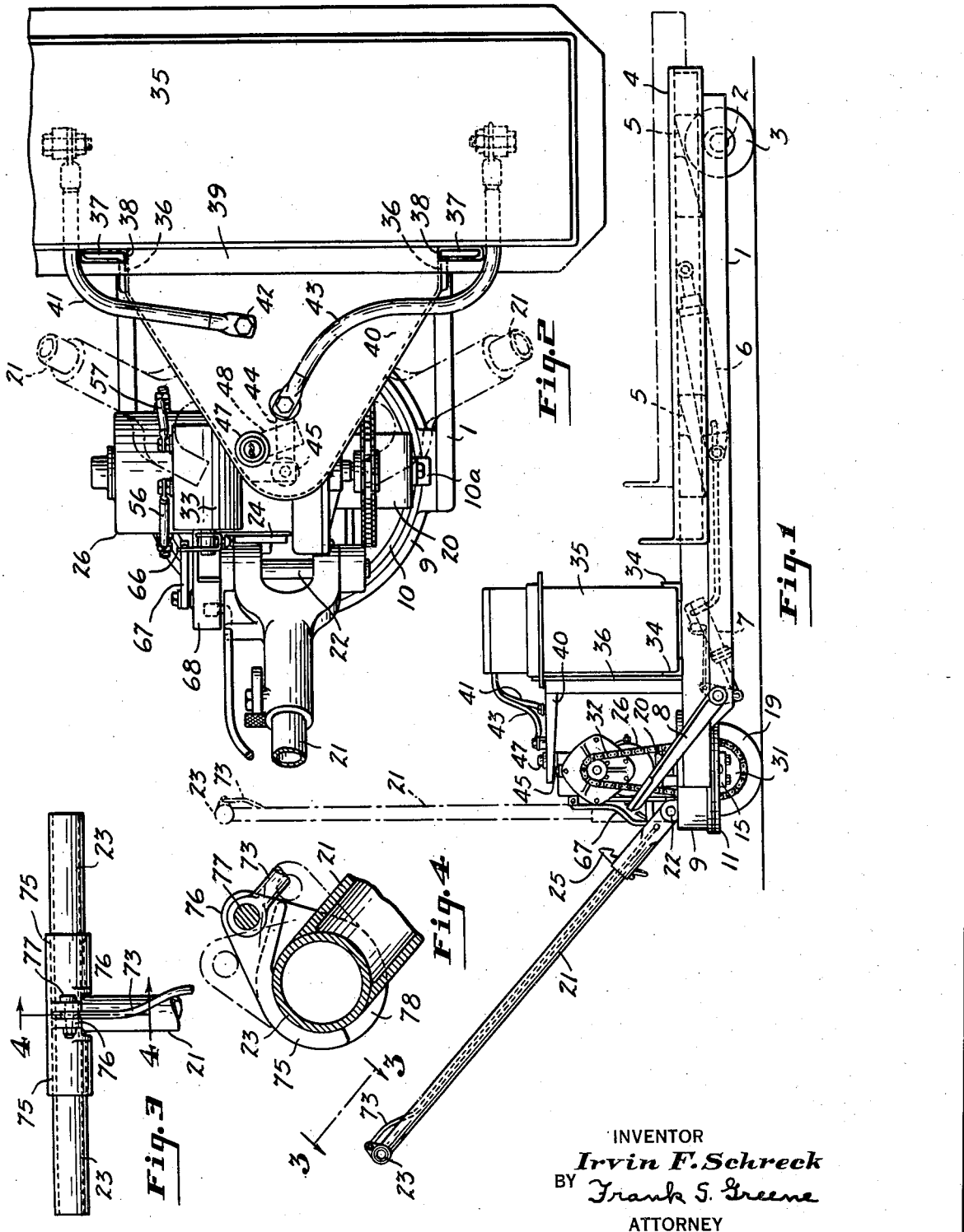
INVENTOR
*Irvin F. Schreck*
BY *Frank S. Greene*
ATTORNEY July 30, 1940.   I. F. SCHRECK   2,209,356
TRUCK
Filed March 11, 1938   3 Sheets-Sheet 2

INVENTOR
*Irvin F. Schreck*
BY *Frank S. Greene*
ATTORNEY

July 30, 1940.  I. F. SCHRECK  2,209,356
TRUCK
Filed March 11, 1938   3 Sheets-Sheet 3
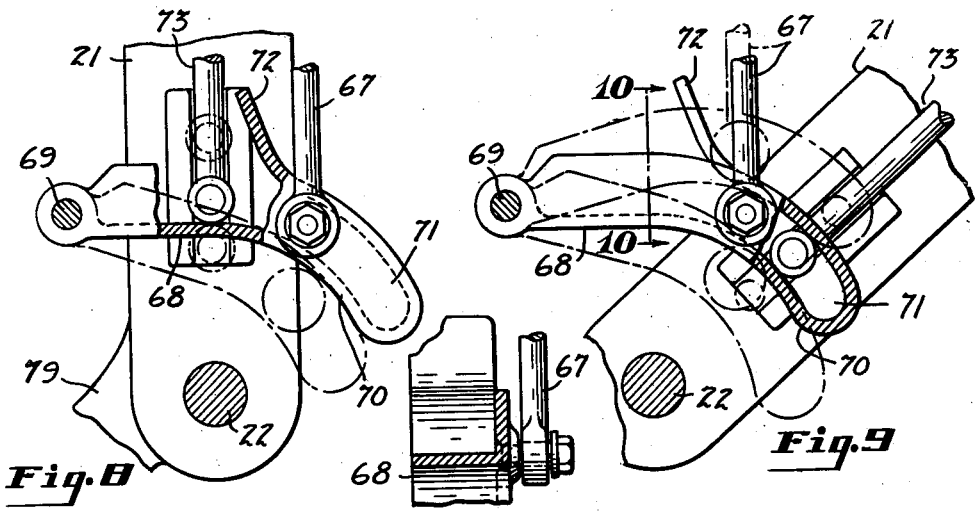
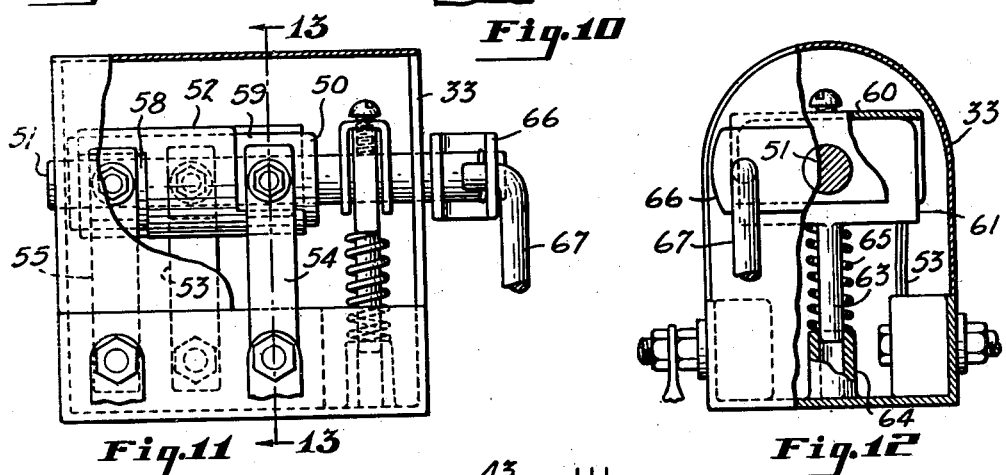
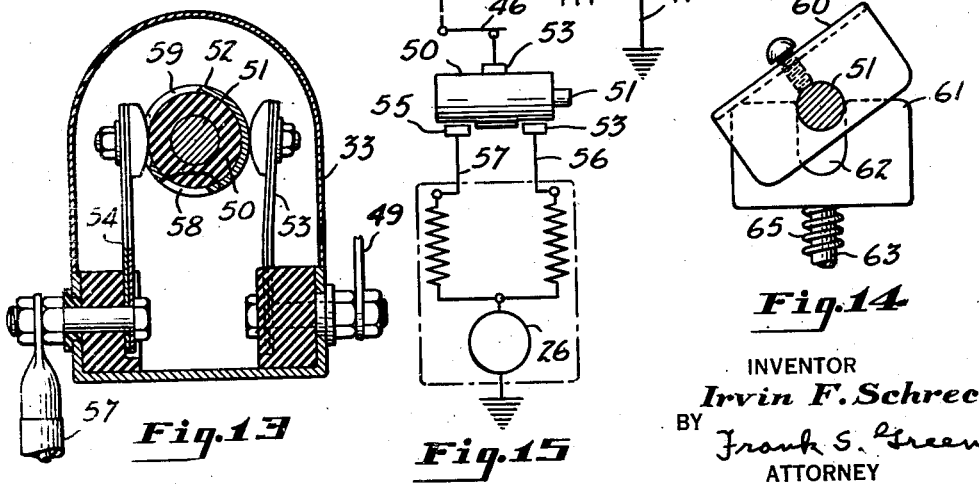
INVENTOR
Irvin F. Schreck
BY Frank S. Greene
ATTORNEY Patented July 30, 1940

2,209,356

UNITED STATES PATENT OFFICE 2,209,356

TRUCK

Irvin F. Schreck, East Cleveland, Ohio

Application March 11, 1938, Serial No. 195,349

16 Claims. (Cl. 180—13)

This invention relates to trucks of the caster-wheel and tongue type adapted to be manually guided and propelled and particularly to low-bodied trucks of the lift type such as are commonly used for transporting loaded skids from place to place in factories or warehouses.

Hand lift trucks often carry loads of more than a ton and when so loaded great physical exertion is required to initially impart movement to the truck or to pull the truck up an incline. Difficulty is also often encountered in retarding movement of a heavily loaded truck and in bringing the loaded truck to a stop at the desired place.

The present invention provides a means for supplementing the strength of the operator in starting the truck to assist in moving the truck up inclines and to bring the truck to a stop quickly when desired, thereby materially speeding up the operation of such trucks and greatly lessening the physical exertion required of the operator.

The present invention has for an object to provide, in a truck of the character referred to, a swiveled wheeled support which has a draft tongue by means of which the truck may be moved manually and a motor drive by means of which power may be employed to propel or assist in propelling the truck when desired, and to provide on the draft tongue a manual control for the power drive by means of which an operator at the forward end of the tongue when the same is in inclined pulling position may cause the truck to be propelled by the motor either forwardly or rearwardly as may be desired.

A further object of the invention is to provide a movable drive controlling element on the handgrip portion of the tongue which is so disposed that it may readily be actuated to cause the truck to be propelled in a forward direction while a pull is being exerted on the tongue or in the reverse direction while the truck is being pushed by means of the tongue.

A further object of the invention is to provide means for automatically rendering the drive mechanism inoperative when the tongue is swung to a vertical position so that the operator cannot cause the truck to be propelled against himself while standing in front of and close to the truck.

A further object is to provide a brake for the truck which is automatically applied when the draft tongue is swung upwardly and rearwardly toward vertical position, so that the operator in front of the truck may quickly and easily arrest forward motion of the truck.

A further object of the invention is to provide a compact steering and propelling unit comprising a motor and one or more traction wheels mounted within an annulus swiveled in the truck frame and having a draft tongue pivotally connected thereto so that an operator may partially relieve the load on the propelling motor by pulling or pushing on the draft tongue.

A further object of the invention is to provide a power driven, swiveling caster unit which is adapted to be mounted at the forward end of a lift truck of standard construction.

With the above and other objects in view the device may be said to comprise the device as illustrated in the accompanying drawings, hereinafter described and particularly set forth in the appended claims, together with such variations and modifications thereof as will be apparent to one skilled in the art to which the invention appertains.

Reference should be had to the accompanying drawings forming a part of the specification, in which:

Figure 1 is a side elevation of a lift truck embodying the invention;

Fig. 2 is a top plan view of the propelling unit and battery mounted on the forward end of the truck frame;

Fig. 3 is a fragmentary plan view on an enlarged scale of the hand grip portion of the tongue;

Fig. 4 is a section taken on the line indicated at 4—4 of Fig. 3;

Fig. 8 is a fragmentary side elevation showing the switch-actuating lever and the lever-actuating rod carried by the tongue, the tongue being shown in upright position;

Fig. 9 is a fragmentary view similar to Fig. 7 showing the position of the lever and rod when the tongue is in an inclined pulling position;

Fig. 10 is a section taken on the line indicated at 10—10 in Fig. 9;

Fig. 11 is a side elevation of the motor-controlling switch;

Fig. 12 is a front elevation of the switch;

Fig. 13 is a section taken on the line indicated at 13—13 in Fig. 11;

Fig. 14 is a front elevation of the spring actuator in the motor-reversing position of the switch;

Fig. 15 is a wiring diagram showing the motor circuit.

Figure 5:
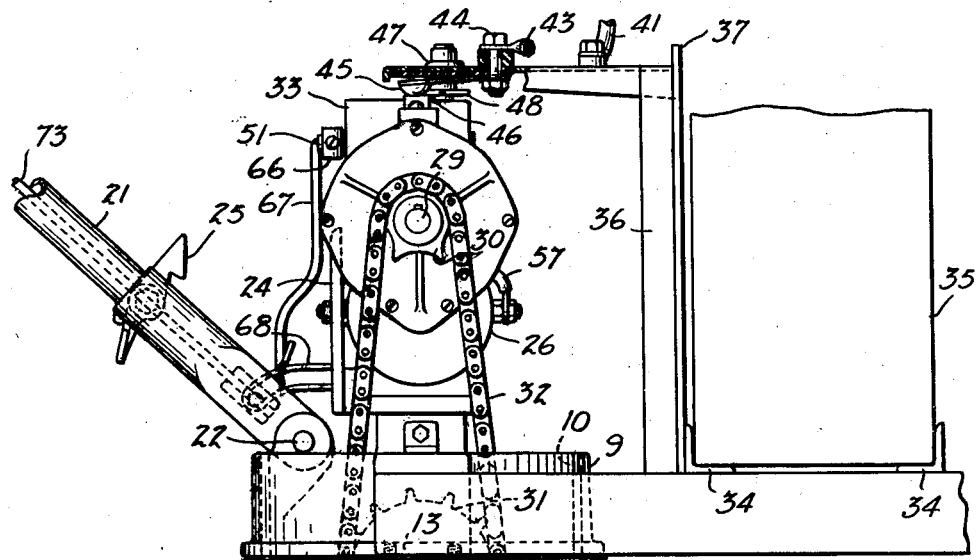
Fig. 5 is a fragmentary side elevation on an enlarged scale showing the propelling unit and battery.
Figures 6, 7:
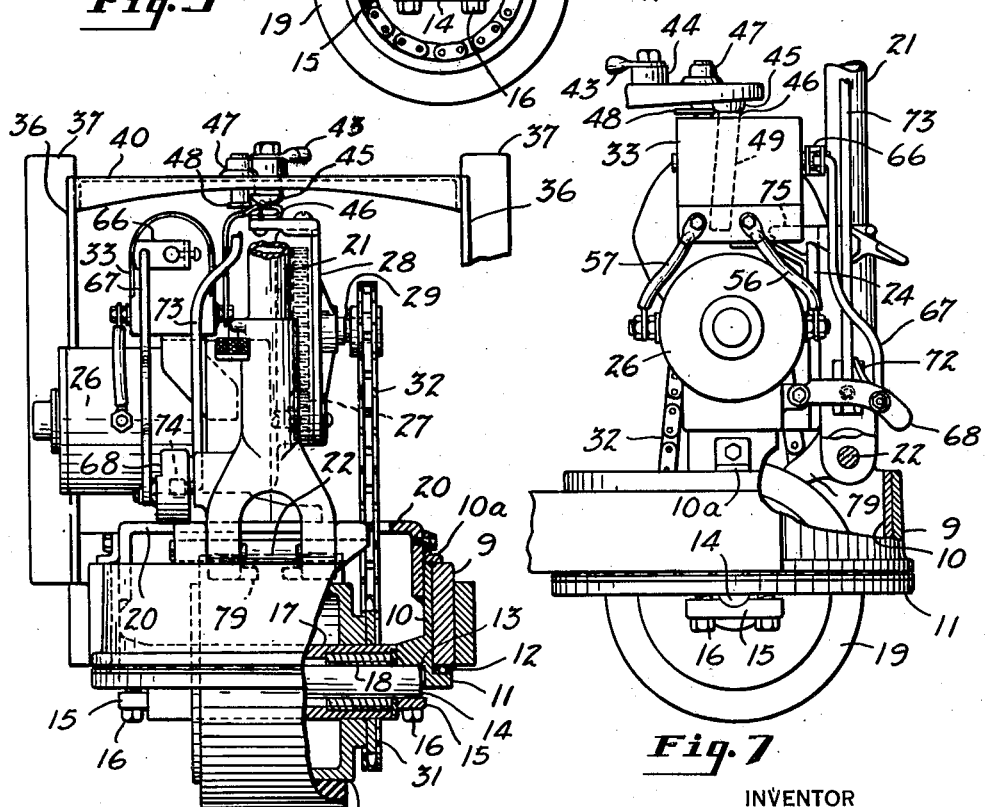
Fig. 6 is a front elevation of the propelling unit on an enlarged scale with portions thereof broken away and shown in section.
Fig. 7 is a side elevation of the propelling unit shown in Fig. 6.

In the accompanying drawings the invention is shown applied to a hand-operated lift truck of conventional construction. The truck frame comprises parallel side bars 1 in the rear ends of which there is journalled an axle 2 carrying the rear supporting wheels 3. Upon the truck frame there is a lift platform 4 mounted on inclined ways 5. The platform 4 may be elevated by means of a fluid pressure cylinder 6 which causes the platform to move upwardly on the ways 5. Fluid under pressure may be supplied to the cylinder 6 by means of a pump 7 operated by a treadle 8. The truck as above described is a conventional hand-operated truck of the lift type adapted, when the platform is lowered, to be run under a loaded skid and, when the platform is elevated, to transport the loaded skid.

Between the forward ends of the side frame members 1 and rigidly attached thereto a bearing annulus 9 is provided. The annulus 9 receives and provides a bearing for an annulus 10 which is the supporting frame of the steering and propelling unit of the present invention. The annulus 10 has an outwardly extending flange 11 at its lower edge which provides a supporting shoulder underlying the annulus 9. Ball bearings 12 may be interposed between the flange 11 and the bottom edge of the annulus 9. The annulus 10 is provided at diametrically opposed points on its lower edge with semi-cylindrical bearing recesses 13 adapted to receive an axle 14 which is held in place by bearing plates 15 secured to the underside of the annulus 10 by means of bolts 16. Within the annulus 10 the axle 14 carries a hub 17 with roller bearings 18 and rotatably mounted on the axle. As herein shown, the hub 17 carries a single wide rubber tired traction wheel 19. If desired two wheels may be attached side by side to the hub.

A bracket 20 secured to the annulus 10 overlies the wheel and axle. A draft tongue 21 is connected by a horizontal pivot 22 to the bracket 20 and is provided at its outer end with laterally extending hand grips 23. The bracket 20 carries a standard 24 which is disposed in the path of movement of the draft tongue 21 so as to limit the rearward movement of the tongue 21, permitting the tongue 21 to be moved upwardly and rearwardly only to the vertical position. The draft tongue 21 is provided with a latch 25 which is engageable with the standard 24 to releasably retain the tongue in its vertical position when desired.

An electric motor 26 is mounted on the bracket 20 and the shaft of this motor is provided with a pinion 27 which meshes with a large gear 28. The gear 28 is mounted upon a countershaft 29 carried by an upwardly extending part of the bracket 20. The countershaft 29 also carries a sprocket 30 which is mounted to turn with the gear 28. The sprocket 30 is aligned with a sprocket 31 affixed to the hub 17 and drives the wheel 19 through a sprocket chain 32 extending over the sprockets 30 and 31. The pinion 27 and large gear 28 provide a gear reduction between the motor shaft and traction wheel. The motor 26 is controlled by switch mechanism within a switch housing 33 which is supported upon the upper end of the standard 24.

The wheel, drive mechanism and motor control elements are all carried upon the annulus 10 and provide a power unit that can be assembled independently of the truck and that can be inserted into or removed from the truck frame while assembled. When mounted within the annulus 9 the propelling and steering unit may be held against downward movement with respect to the bearing annulus 9 by means of lugs 10a detachably secured to the ends of the bracket 20 and bearing upon the upper edge of the annulus 9.

The motor 26 is preferably a low-voltage, low-speed, direct current motor adapted to be operated by a storage battery. The propelling unit is preferably mounted at a distance forwardly of the lift platform 4 sufficient to permit mounting of a storage battery upon the top of the truck frame between the lift platform and the propelling unit. A pair of spaced transversely disposed angle bars 34 secured to the top of the side frame members 1 provide a seat for battery box 35. Immediately in front of the battery box 35 a pair of standards 36 are attached to the side frame members 1. Standards 36 are in the form of angle bars, each having a flange extending forwardly. The forwardly extending flange of each standard 36 is cut away at the upper end of the standard to provide a projecting lug 37 which fits in an aperture 38 in the flange of horizontal angle bar 39 attached to the side of the battery box to hold the box in place.

A horizontal plate 40 of triangular form is secured to the upper end of the standards 36, the plate 40 extending forwardly over the propelling unit and with the apices of its base attached to the standards 36. One battery terminal is connected by a cable 41 to a grounding terminal 42 on the plate 40 and the other battery terminal is connected by a cable 43 to a terminal 44 on the plate 40 through which current is delivered to the motor 26. The terminal 44 has a contact member 45 beneath the plate 40 at the axis of the annulus 10. A contact member 46 mounted on the bracket 20 bears against the under side of the contact member 45. The contact member 46 is connected to the motor 26 through switch mechanism in the housing 33 and is adapted to continuously engage the contact member 45 carried by the plate 40.

In order to prevent use of the propelling motor when desired a key-operated lock 47 may be mounted on the plate 40. This lock may be provided with a laterally swinging tumbler 48 composed of insulating material which is adapted to move from a position at one side of and clear of the contact members 45 and 46 to a position between the two contact members. When the tumbler 48 is positioned between the contact members 45 and 46, the motor and battery are disconnected and when the tumbler 48 is out of engagement with the contact members, the motor may be operated under the control of the switch mechanism. When for any reason it is desired to prevent the use of the propelling motor the lock 47 may be operated to place the tumbler 48 between the contact members.

A lead 49 extends from the contact member 46 to the switch housing 33. The motor controlling switch comprises a drum 50 of insulating material carried by a horizontal shaft 51 journaled in the housing 33. The periphery of the roller 50 has an electrically conductive covering 52 of copper or other suitable metal which is engaged by a contact member 53 to which the lead 49 is connected. The contact member 53 engages the central portion of the drum and is in contact at all times with the conductive covering 52. Two other contact members 54 and 55 engage the periphery of the drum adjacent the ends thereof and on opposite sides. The contact members 54 and 55 are connected by leads 56 and 57 to the forward and reverse fields of the motor 26. The conductive covering 52 of the drum has cut away portions 58 and 59 in the path of the contact members 54 and 55. The cut-away portions 58 and 59 are so disposed with respect to the contact members 54 and 55 that in the neutral position of the drum 50 both contact members 54 and 55 are out of engagement with the conductive covering 52 of the drum. When the drum 50 is turned in either direction from its neutral position one of the contact members 54 or 55 is brought into engagement with the conductive covering while the other remains in engagement with the nonconducting body of the drum. By turning the drum 50 in one direction from its neutral position the motor 26 may be driven in a direction to propel the truck forwardly and by turning the drum 50 in the opposite direction the motor 26 may be driven in the opposite direction.

Means is provided for normally holding the drum 50 in the neutral position in which both contact members 54 and 55 are disconnected from the current supply terminal, a spring actuating device being provided which returns the switch to its neutral position whenever it is released. Beyond one end of the drum 50 within the housing 33 a channel-shaped member 60 is fixed to the shaft 51 with the bottom of its channel disposed above the shaft 51. A block 61 fits within the channel of the member 60 and is provided with a vertically disposed slot 62 which receives the shaft 51 so that the block 61 can be moved vertically with respect to the shaft 51. In its uppermost position the block 61 engages the bottom of the channel 60 and yieldably holds the channel member in a horizontal position and the switch drum 50 in its neutral position. The block 61 is carried by a downwardly extending rod 63 which is guided at its lower end in a socket 64 mounted on the bottom of the housing 33 and is normally held in its uppermost position by coiled spring 65 interposed between the under side of the block 61 and the socket member 64. Rotation of the drum 50 and shaft 51 in either direction forces the block 61 downwardly and compresses the coil spring 65 which acts, upon release of the drum, to return the drum to its neutral position.

At one end of the housing 33 the shaft 51 extends to the outside of the housing and has an arm 66 fixed thereto which is attached to the upper end of an actuating rod 67 which is pivoted at its lower end to an actuating lever 68 connected to the bracket 20 by a pivot 69. The lever 68 has a marginal, laterally extending flange 70 which is continuous along the lower edge of the lever and which extends around the outer end and along the upper edge of the lever to provide a channel 71 in the outer end of the lever. The flange 70 extends inwardly from the outer end along the upper edge of the lever 68, only part way to the inner end of the lever and terminates in an upwardly bent guide lip 72. The draft tongue 21 carries a longitudinally movable rod 73 which extends the full length of the draft tongue and has a roller 74 at its lower end which engages in the channel 71 of the lever 68. When the roller 74 engages in the channel 71 the lever 68 may be swung upwardly or downwardly about its pivot 69 to actuate the switch in either direction from its neutral position to drive the motor in either direction. When the rod 73 is moved inwardly toward the tongue pivot 22, the lever 68 is swung downwardly and the motor is operated in a direction to propel the truck backwardly. When the rod 73 is pulled outwardly the lever 68 is swung in an upward direction and the motor 26 is operated in a direction to propel the truck forwardly. When the tongue 21 is in its inclined pulling position, as shown in Fig. 9, the lever 68 may be actuated in either direction by the rod 73 to cause the truck to be propelled forwardly or backwardly as desired. However, when the tongue 21 is swung rearwardly and upwardly to vertical position as shown in Fig. 8, upward movement of the rod 73 does not actuate the lever 68 because the roller 74 has moved to a position clear of the slot 71 and the rod 73 is free to move upwardly without actuating the lever 68.

The spring 65 normally holds the lever 68 in its central neutral position, as shown in Fig. 8, so that unless the rod 73 is manually operated the motor circuit remains open. The actuation of the truck in a forward direction, however, can only be accomplished when the tongue 21 is swung down with the operator standing a safe distance from the forward end of the truck. When the tongue 21 is in vertical position, an operator standing directly in front of the truck cannot operate the switch to cause the motor to propel the truck against himself.

For actuating the rod 73, a sleeve 75 is rotatably mounted on the hand grip portions 23 of the tongue. The sleeve 75 is mounted on the inner ends of the hand grip portions 23 so that the operator can grip the handles without gripping the sleeve if desired. Centrally thereof, the sleeve is provided with lugs 76. These lugs are connected by a bolt 77 which provides a pivot for the outer end of the rod 73. When the operator, pulling on one or both of the hand grips 23, turns the sleeve 75 in a direction to move the lugs 76 forwardly to draw the rod 73 outwardly the lever 68 is moved in an upward direction to close the motor circuit and cause the truck to be propelled forwardly. When the sleeves 75 are turned in the opposite direction the lever 68 is swung downwardly and the truck is propelled rearwardly. The sleeve 75 is so connected to the motor switch that the direction of movement of the sleeve over the top of the hand grip portion 23 corresponds to the direction in which the truck is propelled due to the actuation of the sleeve. The operator, by gripping the sleeve 75 with the palm of his hand at the rear side of the hand grip 23 and pulling forwardly, automatically turns the sleeve 75 in the direction to cause the motor to propel the truck in the direction in which he is pulling as his arm straightens due to the pull. In pushing the truck rearwardly he grips the sleeve 75 with his palm in front of the hand grip 23 and in the act of pushing on the handle turns the sleeve 75 in the direction to cause the motor to propel the vehicle rearwardly. This arrangement provides a motor control which may be operated simultaneously with the exertion of a pull or push on the handle so that the operator may effectively relieve the load on the motor in starting the movement of a loaded truck in either direction. The sleeve 75 is notched to provide a slot 78 which accommodates the body of the tongue 21, the slot being of sufficient length to permit the necessary turning movements of the sleeve. A brake shoe 79, carried by the inner end of the draft tongue 21, is brought into engagement with the periphery of the traction wheel 19 as the tongue is swung upwardly and is approaching its vertical position. This brake enables the operator to bring the truck to a stop quickly and easily. When the truck is not in motion the draft tongue 21 will ordinarily be held in its vertical position by the latch 25, when it is desired to use the truck, the operator releases the latch 25 and swings the tongue 21 forwardly to pulling position releasing the brake 79 and engaging the roller 74 in the channel 71 of the switch actuating lever 68 so that the motor may be controlled to propel the truck forwardly or rearwardly as desired. Since the initial torque on the motor is high it is desirable that the operator assist in imparting initial movement to the truck. The motor control is, therefore, so arranged that the operator cannot operate the control sleeve 75 on the hand grips 23 while riding on the truck. After the truck has been started in motion the motor will readily furnish the power necessary to propel the truck on a level floor. If the truck is propelled by the motor at a speed greater than that at which the operator is walking the tongue will tend to swing rearwardly and upwardly toward vertical position, and as the truck approaches the operator the motor circuit is automatically disconnected and the operator may quickly apply the brake 79. With ordinary hand trucks heavily loaded it is necessary to begin to retard the movement of the truck at a considerable distance from the place at which it is desired to stop. With the truck of the present invention the release of the driving means and subsequent application of the brake enables the operator to quickly stop the truck at the desired spot.

It will be apparent that the present invention greatly lessens the physical exertion required of workmen operating the trucks and also materially speeds up the operation of the trucks. The device of the present invention is in the form of a compact power unit which can readily be embodied in trucks in the course of manufacture thereof or which may be readily applied to the forward ends of hand lift trucks of standard constuction.

Furthermore, it is to be understood that the particular form of apparatus shown and described, and the particular procedure set forth, are presented for purposes of explanation and illustration and that various modifications of said apparatus and procedure can be made without departing from my invention as defined in the appended claims.

What I claim is:

1. A truck comprising a frame, rear supporting wheels, a swiveled support for the forward end of the truck, a traction wheel carried by said support, means for driving said wheel, a vertically swinging draft tongue connected to said swiveled support, manually operable means carried by said tongue for controlling said driving means, and means controlled by an upward and rearward movement of the tongue for rendering said driving means inoperative independently of said manually operable means.

2. A truck comprising a frame, rear supporting wheels, a swiveled support for the forward end of the truck, a traction wheel carried by said support, means for driving said wheel, a vertically swinging draft tongue connected to said swiveled support, manually operable means carried by said tongue for controlling said driving means, means controlled by an upward and rearward movement of the tongue for rendering said driving means inoperative independently of said manually operable means, and a brake operated by said tongue operable to check the movement of the truck as the tongue is swung upwardly and rearwardly toward the front of the truck.

3. A truck comprising a frame, rear supporting wheels, a swiveled support for the forward end of the truck, a traction wheel carried by said support means for driving said wheel, a vertically swinging draft tongue connected to said swiveled support, a laterally extending hand grip member at the outer end of said tongue, a sleeve mounted to turn upon said hand grip member, means for controlling said driving means to cause said truck to be propelled either forwardly or rearwardly, and means connecting said sleeve to said controlling means whereby a turning movement of the sleeve in one direction causes the truck to be propelled forwardly and a turning movement of the sleeve in the opposite direction causes the truck to be propelled rearwardly.

4. A truck comprising a frame, rear supporting wheels, a swiveled support for the forward end of the truck, a traction wheel carried by said support, means for driving said wheel, a vertically swinging draft tongue connected to said swiveled support, a laterally extending hand grip member at the outer end of said tongue, a sleeve mounted to turn upon said hand grip member, drive controlling means carried by said swiveled support, means connecting said sleeve to said controlling means, and means for rendering the driving means inoperative upon an upward and rearward movement of the draft tongue.

5. The combination with a truck having a frame provided with a horizontally disposed bearing annulus rigidly attached thereto and having a vertically disposed internal bearing portion and a horizontally disposed lower edge portion, of a supporting and propelling unit comprising an annulus which has a vertical bearing portion which rotatably fits within the vertical bearing portion of said frame annulus, an annular shoulder on the propelling unit annulus below the vertical bearing portion thereof and beneath the lower edge of the frame annulus, providing a support for the truck frame, an axle mounted in said propelling unit annulus, a wheel carried by said axle within the annulus, means for driving said wheel to propel the truck comprising a motor mounted on said annulus, a driving connection from said motor to said wheel, and means for turning said propelling unit to steer the truck.

6. A truck comprising a frame, rear supporting wheels, a swiveled support for the forward end of the truck, a traction wheel carried by said support, means for driving said wheel, a vertically swinging draft tongue connected to said swiveled support and having a handle at its outer end, means carried by said tongue for controlling said driving means including a manually operable element on said handle, means controlled by an upward and rearward movement of the tongue for rendering said driving means inoperative independently of said manually operable means, a brake for said wheel, and means controlled by a movement of the tongue about its pivot for applying said brake.

7. In combination with a truck having a frame, a supporting and propelling unit comprising a frame having a swivel connection with the truck frame and provided with a supporting wheel, means for driving said wheel comprising a motor mounted on the swiveled frame and a driving connection from the motor to said wheel, a draft tongue connected to said frame by a horizontal pivot to swing forwardly or rearwardly, said tongue having a hand grip portion, a rotatable sleeve on said hand grip portion, a rod carried by the tongue and actuated by said sleeve, drive controlling means operated by said rod, a brake for said wheel, and means connecting said brake to said tongue to apply said brake upon a rearward movement of said tongue about its pivot and to release the brake upon a forward movement of the tongue.

8. In combination with a truck having a frame, a supporting and propelling unit comprising a frame having a swivel connection with the truck frame and provided with a supporting wheel, means for driving said wheel comprising a motor mounted on the swiveled frame and a driving connection from the motor to said wheel, a draft tongue connected to said frame by a horizontal pivot to swing forwardly or rearwardly, said tongue having a hand grip portion, a rotatable sleeve on said hand grip portion, a rod carried by the tongue and actuated by said sleeve, drive controlling means operated by said rod, a brake for said wheel, and means controlled by movements of said tongue about its pivot for automatically disconnecting the motor and applying said brake as the said tongue swings rearwardly about its pivot.

9. In combination with a truck having a frame, a supporting and propelling unit comprising a frame having a swivel connection with the truck frame and provided with a supporting wheel, means for driving said wheel comprising a motor mounted on the swiveled frame and a driving connection from the motor to said wheel, a draft tongue connected to said frame by a horizontal pivot to swing forwardly or rearwardly, said tongue having a transversely disposed hand grip portion at its outer end, a rotatable sleeve on said hand grip portion, a reversing switch for said motor movable in either direction from a neutral position, means for normally holding said switch in neutral position, means operably connecting said sleeve and switch to move the switch to forward or reverse position upon corresponding turning movements of the sleeve.

10. In combination with a truck having a frame, a supporting and propelling unit comprising a frame having a swivel connection with the truck frame and provided with a supporting wheel, means for driving said wheel comprising a motor mounted on the swiveled frame and a driving connection from the motor to said wheel, a draft tongue connected to said frame by a horizontal pivot to swing forwardly or rearwardly, said tongue having a hand grip portion, a rotatable sleeve on said hand grip portion, a rod carried by the tongue and actuated by said sleeve, a control switch for said motor operated by said rod, and means controlled by pivotal movements of said tongue for opening the motor switch independently of said switch operating rod.

11. In combination with a truck having a frame, a supporting and propelling unit comprising a frame having a swivel connection with the truck frame and provided with a supporting wheel, means for driving said wheel comprising a motor mounted on the swiveled frame and a driving connection from the motor to said wheel, a draft tongue connected to said frame by a horizontal pivot to swing forwardly or rearwardly, said tongue having a hand grip portion, a rotatable sleeve on said hand grip portion, a rod carried by the tongue and actuated by said sleeve, a control switch for said motor movable in opposite directions from a neutral position to control flow of current to the motor to drive the same in a forward or a reverse direction, means for normally holding said switch in neutral position, means including a manually operable member on said tongue for shifting the switch in either direction, and means controlled by a pivotal movement of the tongue for preventing actuation of the switch in one direction by said manually operable member.

12. In combination with a truck having a frame, a supporting and propelling unit comprising a frame having a swivel connection with the truck frame and provided with a supporting wheel, means for driving said wheel comprising a motor mounted on the swiveled frame and a driving connection from the motor to said wheel, a draft tongue connected to said frame by a horizontal pivot to swing forwardly or rearwardly, said tongue having a hand grip portion, a rotatable sleeve on said hand grip portion, a control switch mounted on the frame of said unit, means including a manually operable member on the handle for operating said switch to drive said motor in a forward or reverse direction, and means connecting said manually operable member and switch to operate the switch to drive the motor in a reverse direction in any of the angular positions of the tongue, and means connecting said manually operable member and switch to operate the switch to drive the motor in a forward direction, the last mentioned connecting means being inoperative when said tongue is in its rearmost position.

13. The combination with a truck frame having a horizontally disposed bearing annulus, of a supporting and propelling unit comprising a swiveling annulus having a portion fitting within said frame annulus and a supporting shoulder beneath said frame annulus, an axle extending across the interior of the lower portion of said swiveling annulus, a wheel carried by said axle, a bracket secured to said swiveling annulus and extending above said wheel, a motor mounted on said bracket, a countershaft carried by said bracket, a reduction gearing interposed between said motor and countershaft, a chain and sprocket drive between said countershaft and axle, a draft tongue attached by a horizontal pivot to said bracket, said tongue being movable forwardly and rearwardly about its pivot, a brake for said wheel, and means connecting the tongue and brake for applying said brake as said tongue approaches its rearmost position.

14. A truck of the character described comprising a frame having a horizontally disposed bearing annulus at its forward end, wheels supporting the rear end of said frame, a swiveling annulus fitting within the frame annulus, a supporting wheel mounted within the swiveling annulus, a motor carried by the latter annulus for driving said wheel, a draft tongue pivoted to said swiveling annulus to swing vertically forwardly or rearwardly, means for controlling the motor including a manually operable controlling element on the draft tongue, a lift platform carried by the truck frame rearwardly of said bearing annulus, a storage battery mounted on said truck frame, forwardly of said lift platform and means for supplying current from said battery to said motor, including a terminal connected to the battery and carried by the truck frame above the bearing annulus and axially thereof and a terminal carried by said swiveling annulus, connected to said motor and bearing against the first mentioned terminal member.

15. The combination with a truck having a frame provided with a horizontal disposed bearing annulus rigidly attached thereto, said annulus having a vertically disposed internal bearing portion and a horizontally disposed bearing portion, of a steering and propelling unit comprising a traction wheel, a motor for driving said wheel, a horizontally disposed annulus surrounding said wheel in which said wheel is mounted and to which said motor is attached, said propelling unit annulus having a vertically disposed bearing portion rotatable within the vertically disposed bearing portion of the frame annulus and serving to hold the propelling unit against tilting movements with respect to the frame and a horizontally disposed bearing portion underlying the horizontal bearing portion of the frame annulus to support said frame, and means for turning said propelling unit within the frame annulus to steer the truck.

16. In combination with a truck having a frame, a supporting and propelling unit comprising a frame having a swivel connection with the truck frame and provided with a supporting wheel, means for driving said wheel comprising a motor mounted on the swiveled frame and a driving connection from the motor to said wheel, a draft tongue connected to said frame by a horizontal pivot to swing forwardly or rearwardly, said tongue having a hand grip portion, a reversing switch for said motor movable in two directions from a neutral position, means for normally holding said switch in neutral position, and means for moving said switch in either direction from its neutral position, including a manually operable actuating member carried by said tongue and positioned adjacent said handle.

IRVIN F. SCHRECK.